Patented Oct. 23, 1945

2,387,256

UNITED STATES PATENT OFFICE 2,387,256

CURING PHENOL-FORMALDEHYDE RESINS

Frank J. Groten, Stamford, Conn., assignor to American Cyanamid Company, New York, N. Y., a corporation of Maine No Drawing. Application November 9, 1940, Serial No. 365,019

6 Claims. (Cl. 260—45)

This invention relates to phenol-formaldehyde molding compositions and to processes of curing such compositions.

For many years resins for phenol-formaldehyde molding compositions have been prepared from condensation products of about 1 mol of phenol and slightly less than 1 mol of formaldehyde using an acid catalyst such as sulfuric acid. The condensation product is cured by the addition of hexamethylene tetramine to the molding composition which provides the additional formaldehyde needed for reaction with the excess of phenol and it also provides ammonia which, together with the formaldehyde, causes the resin to convert to the infusible stage. Hexamethylene tetramine is not only expensive but has the disadvantage that it markedly alters the color of phenol-formaldehyde resins and products molded therefrom discolor rapidly upon exposure to light. Thus unpigmented compositions which are cured with hexamethylene tetramine show a bright canary yellow and upon exposure to light this darkens considerably to form a dirty greenish-yellow to a brownish-yellow color.

An object of this invention is to provide a method for curing phenol-formaldehyde molding compositions which does not alter the original light color of the phenol-formaldehyde resins.

Another object of this invention is to provide heat-set phenol-formaldehyde molded articles having improved stability toward discoloration upon exposure to light.

Another object of this invention is to provide phenol-formaldehyde resins having improved electrical properties.

Still another object of this invention is to provide a curing catalyst for phenol-formaldehyde molding compositions which is more economical than hexamethylene tetramine and which possesses many other advantages over the latter.

These and other objects are attained by utilizing a resinous fusible condensation product of melamine and formaldehyde as a curing catalyst for phenol-formaldehyde resins.

The following examples in which the proportions are in parts by weight are given by way of illustration and not in limitation.

EXAMPLE 1

| | Parts |
|---|---|
| Phenol-formaldehyde resin A | 100 |
| Melamine-formaldehyde resin C | 11 |
| Alpha-cellulose pulp | 67 |

Resins A and C are finely ground and mixed together in a ribbon blender, for example, or in a ball mill. During this blending a suitable lubricant, e. g., ¼% of zinc stearate and ½% of calcium stearate, is added and after these are thoroughly blended the filler is added. The blended mixture thus obtained is compounded for about 1–3 minutes on differential rolls (for example, having a speed ratio of 1.5:1), heated to about 110° C. The sheeted material which is taken from the rolls is ground in a hammer mill or other suitable apparatus producing a granular molding composition which may be molded into tumblers, for example, at 155° C. for about 3 minutes under pressure of about 2000 to 2500 pounds per square inch. The resulting molded tumblers have a water absorption of about 3.2% after one-half hour in boiling water and are rubbery when first removed from the mold.

EXAMPLE 2

| | Parts |
|---|---|
| Phenol-formaldehyde resin A | 100 |
| Melamine-formaldehyde resin C | 25 |
| Alpha-cellulose pulp | 75 |

The resins are ground together with the mold lubricant and blended with the alpha-cellulose pulp in the same general manner as described in Example 1. The blended material is compounded, ground into a molding composition and molded, also as described in Example 1. The resulting molded tumblers have a water absorption of about 1.5% after one-half hour in boiling water and are more rigid than products made according to Example 1 when first removed from the mold and while still at about the mold temperature.

EXAMPLE 3

| | Parts |
|---|---|
| Phenol-formaldehyde resin A | 100 |
| Melamine-formaldehyde resin C | 100 |
| Alpha-cellulose pulp | 120 |
| Pigment (burnt sienna and yellow dye) | 13 |

The resins are ground together and blended with the pigment and mold lubricant and when thoroughly blended, the filler is added, all in the same general manner as described in Example 1. The resulting material is compounded, ground and molded into ivory colored tumblers which have a water absorption of about 0.7% and are quite rigid when first removed from the mold.

EXAMPLE 4

| | Parts |
|---|---|
| Phenol-formaldehyde resin B | 100 |
| Melamine-formaldehyde resin C | 100 |
| Alpha-cellulose pulp | 120 |
| Pigment (burnt sienna and yellow dye) | 13 |

The resins are ground together with the pigment and mold lubricant and blended with the alpha-cellulose pulp in the same general manner as described in Example 1. The blended material is compounded, ground into a molding composition and molded into ivory colored tumblers, also as described in Example 1. The resulting molded tumblers have a water absorption of about 1% and are somewhat rubbery when first removed from the mold.

EXAMPLE 5

| | Parts |
|---|---|
| Phenol-formaldehyde resin A | 307 |
| Melamine-formaldehyde resin D | 103 |
| Alpha-cellulose pulp | 250 |
| Pigment (burnt sienna and yellow dye) | 2 |

The resins are blended and compounded in the same general manner as described in Example 1. Molded tumblers of the resulting product have a water absorption of about 2.9%, thereby indicating that it is cured to about the same extent as similar phenolic resins cured with hexamethylene tetramine.

EXAMPLE 6

| | Parts |
|---|---|
| Phenol-formaldehyde resin A | 100 |
| Melamine-formaldehyde resin D | 100 |
| Alpha-cellulose pulp | 120 |
| Pigment (burnt sienna and yellow dye) | 1½ |

The resins are blended and compounded in the same general manner as described in Example 1. Molded tumblers of the resulting product have a water absorption of about 2%.

EXAMPLE 7

| | Parts |
|---|---|
| Phenol-formaldehyde resin A | 100 |
| Melamine-formaldehyde resin C | 17.5 |
| Wood flour | 118 |
| Nigrosine | 3 |
| Carbon black | 1 |

The resins are blended and compounded in the same general manner as described in Example 1. Molded tumblers of the resulting product have a water absorption of about 3.3% and are somewhat soft and rubbery upon removal from the mold.

EXAMPLE 8

| | Parts |
|---|---|
| Phenol-formaldehyde resin A | 100 |
| Melamine-formaldehyde resin C | 25 |
| Wood flour | 125 |
| Nigrosine | 3¼ |
| Carbon black | 1¼ |

The resins are blended and compounded in the same general manner as described in Example 1. Molded tumblers of the resulting product have a water absorption of about 2.6%, thereby indicating that they are cured to about the same extent as similar phenolic resins cured with hexamethylene tetramine. Molded parts made from the above molding composition have excellent electrical properties. The arc resistance of such compositions is about 45 seconds (A. S. T. M.) as compared to 3–5 seconds for ordinary phenol-formaldehyde moldings. Furthermore, the dielectric strength in oil at 100° C. of my product is about 184 V./mil as compared to 80 V./mil for ordinary phenol-formaldehyde resins.

Preparation of phenol-formaldehyde resin A

| | Parts |
|---|---|
| Phenol (1 mol) | 94 |
| Formalin (0.9 mol) | 73 |
| Dilute sulfuric acid (4%) | 15 |

These substances are placed in a suitable reaction chamber, provided with a reflux condenser and heated gradually to 96–110° C. during which time an exothermic reaction takes place which assists in the heating process. After the mixture is thus heated, it is refluxed for about 1 hour (at approximately 98° C.) and then the water is removed by heating under a vacuum of 9–15 inches of mercury absolute pressure until the product is substantially dehydrated. The dehydrated resin is cast and cooled to form a hard, brittle product which may be ground to about 100 mesh.

Preparation of phenol-formaldehyde resin B

A resin is prepared in the same general manner as described for the preparation of resin A except that just prior to the dehydration step, the mixture is partially neutralized, adding sufficient caustic soda so that the product is only slightly acid, e. g., around a pH 6.

Preparation of melamine-formaldehyde resin C

| | Parts |
|---|---|
| Melamine (1 mol) | 126 |
| Formalin (3 mols) | 243 |

The pH of the mixture of these substances is adjusted to about 6.3 as determined by bromthymol blue indicator and the mixture is heated to about 80° C. for about one-half hour. The tempertaure is then allowed to drop to about 60° C. and it is maintained at that temperature for about one-half hour measured from the time that the mixture originally attained 60° C. After this time the syrup is adjusted to a pH of about 8–8.5 and it is filtered to remove any insoluble materials which may be present, thereby producing a clear hydrophilic resin syrup. The syrup is now concentrated by heating under a vacuum of about 9–10 inches of mercury absolute pressure, the vacuum being maintained at such a point that the temperature of the resinous syrup would be hot enough to keep it fluid. When the resinous syrup has been substantially dehydrated it is removed from the kettle and cooled to produce a substantially clear solid resin which is ground to a fine while powder.

Preparation of melamine-formaldehyde resin D

| | Parts |
|---|---|
| Melamine (1 mol) | 126 |
| Formalin (5 mols) | 405 |

This resin is prepared in accordance with the preparation of melamine-formaldehyde resin C. When the resinous syrup has been substantially dehydrated, it is removed from the kettle and cooled to produce a substantially clear, solid resin which is ground to a fine white powder.

The formalin used in the preparation of the various resins is a 37% solution of formaldehyde in water.

The ratio of formaldehyde to melamine may be varied from about 2 mols up to 5 or 6 mols and even more formaldehyde to 1 mol of melamine. Generally no particular advantage is found in using extremely high ratios of formaldehyde to melamine inasmuch as the excess formaldehyde is set free during the molding operation.

Melamine resins suitable for use according to my invention are those which may be ground to fine powders and which are also fusible at elevated temperatures, e. g., 100–150° C.

The phenol-formaldehyde resins which may be cured with melamine-formaldehyde resins are those which are condensed under acid conditions and in which the ratio of phenol to formaldehyde is equal to or greater than about 1:1. Such resins are permanently fusible and thermoplastic unless a curing catalyst be added. Generally phenol-formaldehyde resins having a ratio of phenol to formaldehyde of about 1:0.9 or 1:0.95 are preferred. Other phenolic materials may be substituted for part or all of the phenol in the above examples. Among these the cresols (as well as mixtures of cresols and low boiling xylenols) are particularly useful in the production of materials having especially good electrical properties. In order to produce a fully cured product a catalyst such as hexamethylene tetramine is usually required. Hexamethylene tetramine breaks up at molding temperatures and provides formaldehyde to react with the excess phenol present and also provides ammonia which assists in the curing operation.

My invention possesses many advantages over the use of the conventional curing catalysts such as hexamethylene tetramine. Among these one of the most important advantages is the absence of discoloration in light-colored materials, probably due to the fact that ammonia is not set free, which is characteristic of the products cured with hexamethylene tetramine. Another advantage is in the improved light stability which characterizes my products as compared to the conventional hexamethylene tetramine cured resins.

My invention is of importance with respect to the economics involved inasmuch as hexamethylene tetramine is quite expensive and the amounts usually used do not add substantially to the weight of resin ultimately obtained. On the other hand, if melamine-formaldehyde resins are used as the curing catalyst, they not only perform their catalytic function but they also add to the resin yield. Furthermore, there is a loss in weight when hexamethylene tetramine is used due to the ammonia which is given off. Accordingly, the use of melamine-formaldehyde resins may be much more economical than the use of hexamethylene tetramine.

While I generally prefer to use melamine-formaldehyde resin alone as a curing catalyst, it may be desirable in some instances to use small proportions of other curing catalysts. If light colors are not required, small proportions of hexamethylene tetramine in combination with the melamine-formaldehyde resins may be more economical than the use of either type of curing catalyst individually. Furthermore, by the use of such compositions products may be obtained having properties which are particularly suitable for special applications.

Generally from about 1 part of melamine-formaldehyde resin up to about 10 parts of melamine-formaldehyde resin are used in order to cure about 10 parts of phenol-formaldehyde resin. Preferably the ratio of phenol-formaldehyde resin to melamine-formaldehyde resin should be less than 4:1. Ratios of melamine-formaldehyde resin to phenol-formaldehyde resin higher than 1:1 are generally undesirable from a commercial point of view inasmuch as phenol-formaldehyde resins are generally cheaper than melamine-formaldehyde resins.

Obviously various other fillers, dyes and pigments than those indicated above may be substituted for part or all of those used in the foregoing examples. Examples of these are: lithopone, zinc oxide, ferric oxide, Prussian blue, toluidine red, malachite green, mica, ground glass, glass fibers, powdered silica, asbestos, diatomaceous earth (e. g., "Celite"), etc.

Compositions made according to my invention may be molded in the usual manner and in some instances they may be molded by extrusion or injection molding methods. Furthermore, products made according to my invention may be useful in the production of molded shapes which must be stripped from the mold inasmuch as some of them retain a considerable amount of flexibility while still hot.

Another variation in my process which may be useful in some instances is a heat treatment of the mixtures of resins in an internal mixer, e. g., a Banbury mixer before the resins are compounded on the rolls. Such a heat treatment may be carried out at temperatures of about 100-115° C. and for one to several minutes.

Obviously many modifications and variations in the processes and compositions described above may be made without departing from the spirit and scope of the invention as defined in the appended claims.

I claim:

1. A molding composition comprising a permanently fusible acid catalyzed phenol-formaldehyde condensation product wherein the molal ratio of the phenol to formaldehyde is about 1:0.9 and a separately prepared fusible melamine-formaldehyde resin wherein the molal ratio of formaldehyde to melamine is about 2:1 and where the ratio of phenol-formaldehyde resin to melamine-formaldehyde resin is between about 10:1 and 1:1.

2. A molding composition comprising a fusible acid catalyzed phenol-formaldehyde condensation product wherein the molal ratio of the phenol to formaldehyde is about 1:0.9 and a separately prepared fusible melamine-formaldehyde resin wherein the molal ratio of formaldehyde to melamine is about 3:1 and where the ratio of phenol-formaldehyde resin to melamine-formaldehyde resin is between about 10:1 and 1:1.

3. A process which comprises polymerizing a separately prepared permanently fusible acid catalyzed phenol-formaldehyde resin wherein the molal ratio of the phenol to formaldehyde is about 1:0.9 by heating in the presence of and intimately mixed with a fusible melamine-formaldehyde resin wherein the molal ratio of formaldehyde to melamine is at least about 2:1 and where the ratio of phenol-formaldehyde resin to melamine-formaldehyde resin is between about 10:1 and 1:1.

4. A molding composition comprising a permanently fusible acid catalyzed phenol-formaldehyde condensation product wherein the molal ratio of the phenol to formaldehyde is at least 1:1 and a separately prepared fusible melamine-formaldehyde resin wherein the ratio of formaldehyde to melamine is at least about 2:1, the ratio of melamine resin to phenol resin being between about 1:10 and 1:1.

5. A molding composition comprising a permanently fusible acid catalyzed phenol-formaldehyde condensation product wherein the molal ratio of the phenol to formaldehyde is at least 1:1 and a separately prepared fusible melamine-formaldehyde resin wherein the ratio of formaldehyde to melamine is at least about 2:1, the ratio of melamine resin to phenol resin being between about 1:4 and 1:1.

6. A process which comprises polymerizing a separately prepared permanently fusible acid catalyzed phenol-formaldehyde resin wherein the molal ratio of the phenol to formaldehyde is at least 1:1 by heating in the presence of and intimately mixed with a fusible melamine-formaldehyde resin wherein the molal ratio of formaldehyde to melamine is at least about 2:1 and wherein the ratio of phenol-formaldehyde resin to melamine-formaldehyde resin is between about 10:1 and 1:1.

FRANK J. GROTEN.